(12) United States Patent
Lu et al.

(10) Patent No.: US 10,511,451 B2
(45) Date of Patent: Dec. 17, 2019

(54) PHYSICALLY UNCLONABLE FUNCTION (PUF) DEVICE AND METHOD OF EXTENDING CHALLENGE/RESPONSE PAIRS IN A PUF DEVICE

(71) Applicant: TAIWAN SEMICONDUCTOR MANUFACTURING COMPANY LTD., Hsinchu (TW)

(72) Inventors: Shih-Lien Linus Lu, Hsinchu (TW); Saman M. I. Adham, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 386 days.

(21) Appl. No.: 15/343,555

(22) Filed: Nov. 4, 2016

(65) Prior Publication Data

US 2018/0131527 A1    May 10, 2018

(51) Int. Cl.
*H04L 9/32* (2006.01)
*G06F 7/58* (2006.01)
*G09C 1/00* (2006.01)

(52) U.S. Cl.
CPC ............ *H04L 9/3278* (2013.01); *G06F 7/584* (2013.01); *G09C 1/00* (2013.01); *H04L 2209/12* (2013.01)

(58) Field of Classification Search
CPC .............................. H04L 9/3278; G06F 7/584
See application file for complete search history.

(56) References Cited

U.S. PATENT DOCUMENTS

| | | | |
|---|---|---|---|
| 10,031,723 B1* | 7/2018 | Takahashi | G06F 7/588 |
| 2017/0257222 A1* | 9/2017 | Pedersen | G06F 1/26 |
| 2017/0277457 A1* | 9/2017 | Lu | G11C 11/41 |
| 2017/0288885 A1* | 10/2017 | Khatib Zadeh | H04L 9/3278 |

* cited by examiner

*Primary Examiner* — Khalil Naghdali
(74) *Attorney, Agent, or Firm* — WPAT, P.C., Intellectual Property Attorneys; Anthony King

(57) ABSTRACT

A physically unclonable function (PUF) device comprises a memory block including an array of cells, and a pseudo random number generator (PRNG) configured to generate a number of addresses to challenge the memory block in response to an element selected out of a combination.

20 Claims, 6 Drawing Sheets

PHYSICALLY UNCLONABLE FUNCTION (PUF) DEVICE AND METHOD OF EXTENDING CHALLENGE/RESPONSE PAIRS IN A PUF DEVICE

BACKGROUND

A physically unclonable function (PUF) refers to a physical structure that is embodied in a physical device. Today, PUFs are usually implemented in integrated circuits and are typically used in applications with high security requirements. Static random access memory (SRAM) PUF is an example of such technology that is becoming popular. A PUF device is easy to evaluate but hard to predict or clone due to the way it is constructed based on the inherent process variations of devices. As a result, a PUF device is easy to make but practically impossible to duplicate, even given the exact manufacturing process that produced it. In this respect it is the hardware analog of a one-way function.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
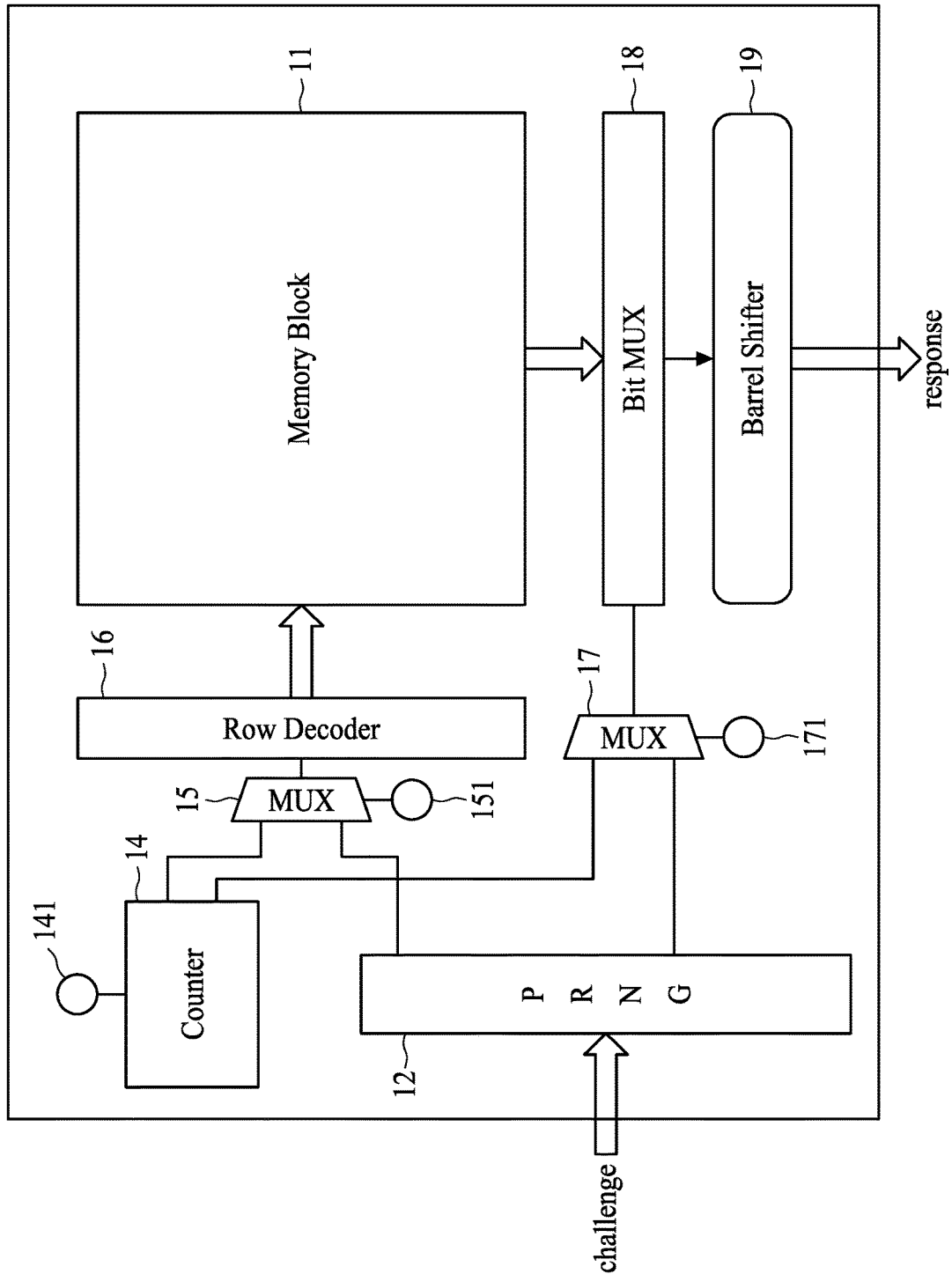
FIG. 1 is a block diagram of a physically unclonable function (PUF) device in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a block diagram of a physically unclonable function (PUF) device 10 in accordance with some embodiments. Referring to FIG. 1, the PUF device 10 includes a memory block 11 such as a random access memory (RAM) block or a static random access memory (SRAM) block, a pseudo random number generator (PRNG) 12, a counter 14, multiplexers 15, 17, a row decoder 16, a bit multiplexer 18, a barrel shifter 19 and fuse devices 141, 151 and 171. The PUF device 10, an SRAM-based PUF, is configured to generate a response in response to a challenge. A challenge refers to an input to the PUF device 10, which indicates a specific cell address in the memory block 11, while a response refers to an output of the PUF device 10 in response to an input, which reads a data value stored in an indexed cell.

The memory block 11 includes a number of cells that may each formed by a transistor structure. For example, a cell may include a 4T (four-transistor), 6T, 8T or 10T structure, depending on circuit design. Due to manufacturing factors, some transistors may be easier to turn on than the others. As a result, when powered on, some cells in a memory block are inclined to output a high logical value (logic "1") while the others are inclined to output a low logical value (logic "0"). The start-up states of the cells produce a unique data pattern of the memory block, which is unclonable given the same manufacturing processes and conditions.

The size of the memory block 11 concerns the size of a challenge. Given a 4K memory block, to obtain a one-bit (1b) output, a twelve-bit (12b) input is required because it takes 12b to address a specific cell in the memory block 11, knowing that 4K (4,096 bits) equals two to the power of twelve ($4,096=2^{12}$).

In some existing PUF devices, to obtain, for example, a 256b response, a total number of 256 such 12b inputs are required. In operation, a first 12b input is entered to an existing PUF device in order to obtain a first 1b output of the response. Next, a second 12b input different from the first 12b input is entered to the existing PUF device in order to obtain a second 1b output of the response. The process continues until a $256^{th}$ 12b input is entered and a $256^{th}$ 1b output is obtained. The challenge/response (C/R) process is said to be "unbalanced" because it takes two hundred and fifty-six (256) different 12b inputs to obtain one 256b response. Moreover, the existing PUF devices may operate on a single C/R pair basis, in which one input of a challenge results in one output bit of a response. With only one C/R pair the application of the existing PUF devices is limited.

The present disclosure provides a way to allow, for example, an SRAM-based PUF device to have more than one C/R pairs, in which one input of a challenge results in several output bits of a response. As will be discussed below, given a memory array of bits, by selecting some bits out of a large number of bits, a combination of numerous elements can be obtained. Each element in the combination can serve as a candidate for a challenge. As an example of the 4K memory block 11, if 1b output is read each time from the 4K array of cells, a 12b address is required. To obtain a 256b response, 256 addresses each having 12 bits are needed. The total number of possible combinations of selecting 256 bits out of 4,096 bits is C(4096, 256), or approximately 1.9E+ 414, which is a relatively large number.

Figure 2:
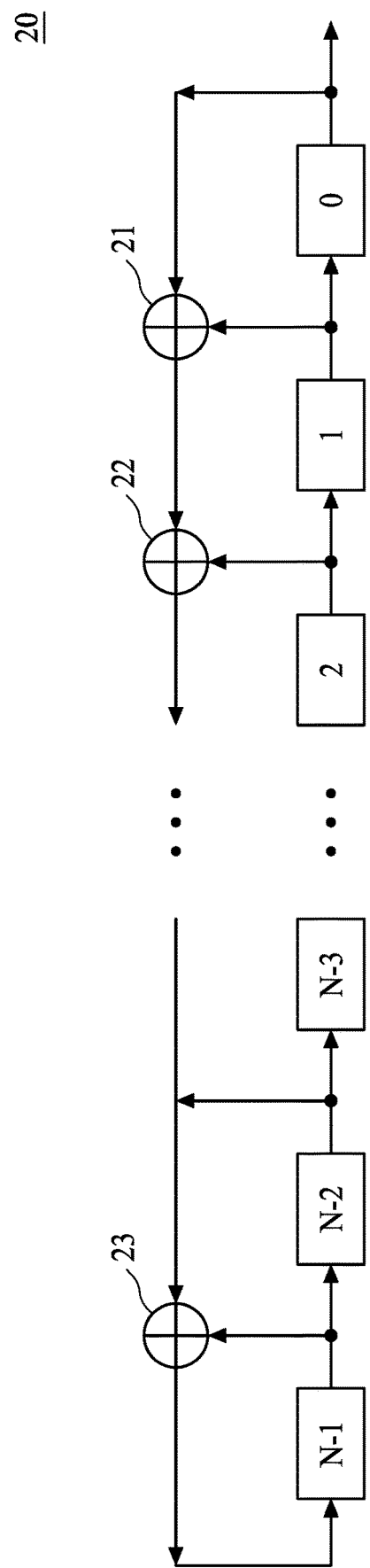
FIG. 2 is a circuit diagram of a linear feedback shift register (LFSR) in the exemplary PUF device illustrated in FIG. 1.

The PRNG 12 is used to generate a sequence of 256 12b addresses. Specifically, the PRNG 12 is configured to generate a number of addresses based on an element selected from the combination in order to challenge the memory block 11. In an embodiment, the PRNG 12 includes a linear feedback shift register (LFSR). An LFSR is a shift register that, when clocked, advances a signal through the shift register from one bit to the next most significant bit. FIG. 2 is a circuit diagram of an exemplary LFSR 20 in the PUF device 10 as illustrated in FIG. 1. Referring to FIG. 2, the LFSR 20 includes a number of flip-flops labeled 0 to N−1 and exclusive-or (XOR) gates 21, 22 and 23 at exemplary locations. Locations of the XOR gates may be determined by a primitive polynomial. Accordingly, some of the outputs of the flip-flops are combined in XOR configuration to form a feedback mechanism. In the LFSR 20, an input bit is a linear function (i.e., XOR in the present example) of its previous state. Moreover, the bit positions that affect the next state are called "taps." The taps are XORed sequentially with an output bit from a previous-stage XOR gate and then fed back as an input to the LFSR 20. When the outputs of the flip-flops are loaded with a seed value, which is a selected element from the combination, and when the LFSR 20 is clocked, a pseudo random pattern of 0's and 1's in a sequence accumulated at the taps of interest is generated. The LFSR 20 is not limited to the XOR configuration. For example, the LFSR 20 may include exclusive-nor (XNOR) gates as an alternative.

To get a large period, the LFSR 20 may be configured with a relatively long length. In the present embodiment, the number of flip-flops in the LFSR 20 is 256 (N=256). Accordingly, the period of the LFSR is 2 to the power of 256 ($2^{256}$). This is also a large number (1.15E+77) but not as large as C(4096, 256). As a result, the LFSR 20 has 256 bits, in which 12 bits from the LFSR 20 out of the 256 bits are tapped at each clock cycle to serve as an address to challenge the memory block 11. By function of the LFSR 20, a new 12b address is generated at each cycle to challenge the memory block 11. Referring back to FIG. 1, during a challenge process, the multiplexers 15 and 17 are configured to select an output from the LFSR 20. In response to a 12b address from the LFSR 20, the row decoder 16 and the bit multiplexer 18, which operates in conjunction with the multiplexers 15 and 17, respectively, select a bit from the memory block 11. As a result, the memory block 11 outputs a single bit at each cycle. The bits output from the memory block 11 are accumulated at the barrel shifter 19. The barrel shifter 19 outputs the bits accumulated as a response when the number of accumulated bits reaches a predetermined response size. Since a barrel shifter has been a known circuit device, its operation and structure are not further discussed for brevity.

In operation, there are two paths to access the memory block 11. A first path is for synchronization of the contents of the memory block 11 initially, and a second path is for getting C/R pairs (normal PUF operation). The normal PUF operation is discussed below.

Given a 256b response, in an embodiment, the LFSR 20 runs a first round of 16 cycles in response to a first element selected from the combination to obtain a first set of 16 output bits from the memory block 11. Next, the LFSR 20 runs a second round of 16 cycles in response to a second element selected from the combination to obtain a second set of 16 output bits from the memory block 11. The process continues until the LFSR 20 runs a sixteenth (16th) round of 16 cycles in response to a 16th element selected from the combination to obtain a 16th set of 16 output bits from the memory block 11. Subsequently, the accumulated output bits, 256 bits (16 bits each cycle and repeated 16 times) in total, are output from the barrel shifter 19 as the 256b response.

In another embodiment, the LFSR 20 runs a first round of 8 cycles in response to a first element selected from the combination to obtain a first set of 8 output bits from the memory block 11. Next, the LFSR 20 runs a second round of 8 cycles in response to a second element selected from the combination to obtain a second set of 8 output bits from the memory block 11. The process continues until the LFSR 20 runs a thirty-second (32 nd) round of 8 cycles in response to a 32 nd element selected from the combination to obtain a 32 nd set of 8 output bits from the memory block 11. Subsequently, the accumulated output bits, 256 bits (8 bits each cycle and repeated 32 times) in total, are output from the barrel shifter 19 as the 256b response.

In still another embodiment, the LFSR 20 runs a first round of 32 cycles in response to a first element selected from the combination to obtain a first set of 32 output bits from the memory block 11. Next, the LFSR 20 runs a second round of 32 cycles in response to a second element selected from the combination to obtain a second set of 32 output bits from the memory block 11. The process continues until the LFSR 20 runs an eighth (8th) round of 32 cycles in response to an 8th element selected from the combination to obtain an 8th set of 32 output bits from the memory block 11. Subsequently, the accumulated output bits, 256 bits (32 bits each cycle and repeated 8 times) in total, are output from the barrel shifter 19 as the 256b response.

In yet still another embodiment, the LFSR 20 runs a single round of 256 cycles in response to an element selected from the combination to obtain a set of 256 output bits from the memory block 11. Subsequently, the accumulated output bits, 256 bits in total, are output from the barrel shifter 19 as the 256b response.

The present disclosure is not limited to the specific times of cycle runs or repeat operations in the above-mentioned embodiments. Other arrangements of cycle runs or repeat operations also fall within the contemplated scope of the present disclosure. For example, given a cell array of $2^n$ bits and a desired response of m bits, n and m being natural numbers, the LFSR 20 may run p cycles to obtain p addresses in response to an element, and then repeat q times each running p cycles in response to different elements, where p multiplied by q equals m, p and q being natural numbers.

Figure 3:
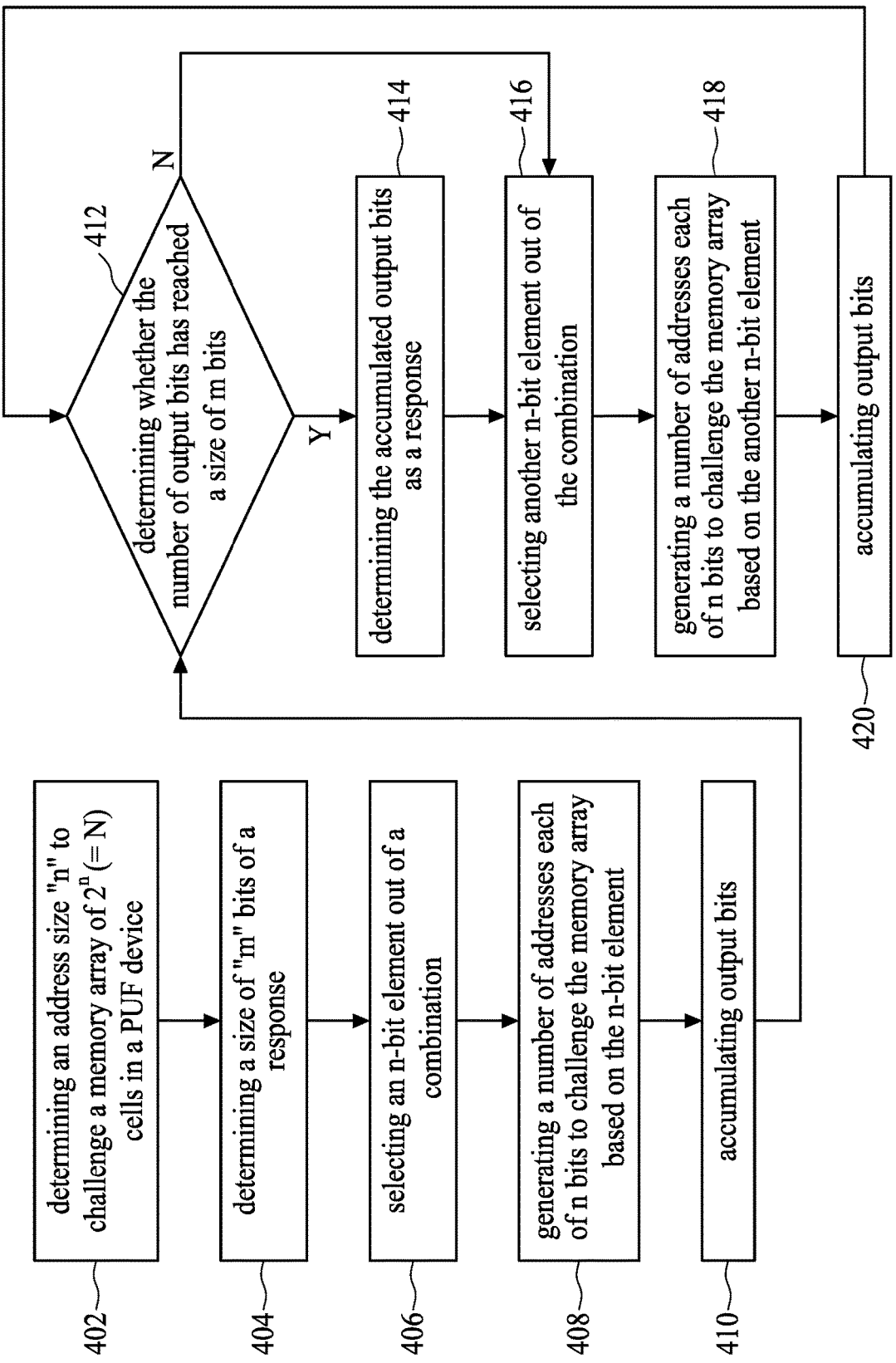
FIG. 3 is a flow diagram illustrating a method of extending challenge/response pairs in a PUF device in accordance with some embodiments.

FIG. 3 is a flow diagram illustrating a method of extending challenge/response pairs in a PUF device in accordance with some embodiments. Referring to FIG. 3, in operation 402, an address size "n" to challenge a memory array of $2^n$(=N) cells in a PUF device is determined.

Further, in operation 404, a size of "m" bits of a response is determined.

Next, in operation 406, an n-bit element out of a combination is selected. The selected n-bit element serves as a seed value to the LFSR 20.

In operation 408, based on the selected n-bit element, a number of addresses each of n bits are generated to challenge the memory array.

In operation 410, bits output from the memory array are accumulated.

Then in operation 412, it is determined whether the number of output bits has reached a size of m bits. If affirmative, in operation 414, the accumulated output bits are determined as a response. If not, in operation 416, another n-bit element out of the combination is selected. Next, in operation 418, based on the other n-bit element a number of addresses each of n bits is generated to challenge the memory array. The output bits are accumulated in operation 420.

The operations 412 to 420 are repeated until the number of output bits has reached the size of m bits.

Referring back to FIG. 1, as previously mentioned, the PUF device 10 provides a path for synchronization of the contents of the memory block 11, in addition to the normal PUF operation as described and illustrated with reference to FIG. 3. During a synchronization process, the counter 14 generates all addresses to read out the entire contents (i.e., data pattern or start-up states) of the SRAM block 11 to synchronize with a partner, for example, a server. The synchronization process is performed prior to the normal PUF operation process. The fuse devices 141, 151 and 171 are used to facilitate the synchronization process.

Figure 4A:
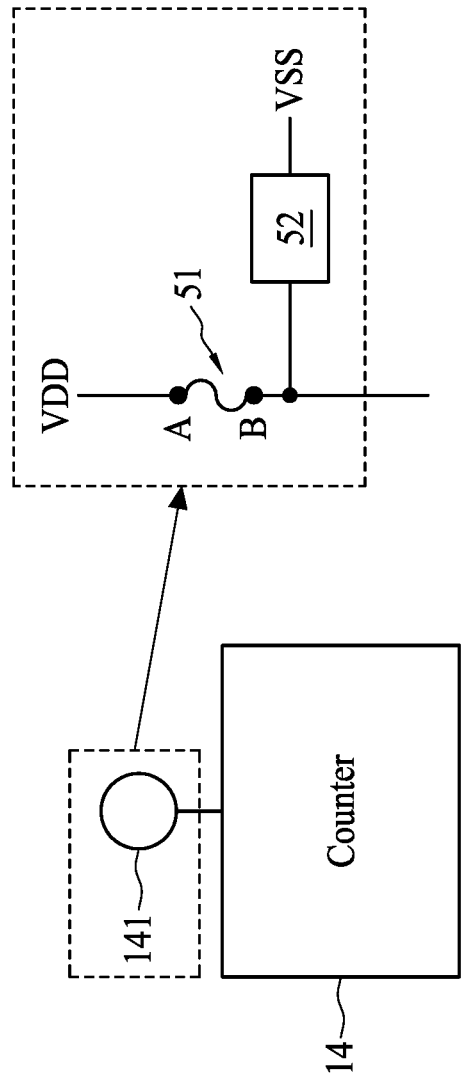
FIGS. 4A and 4B are schematic diagrams of fuse devices in the exemplary PUF device illustrated in FIG. 1.
Figure 4B:
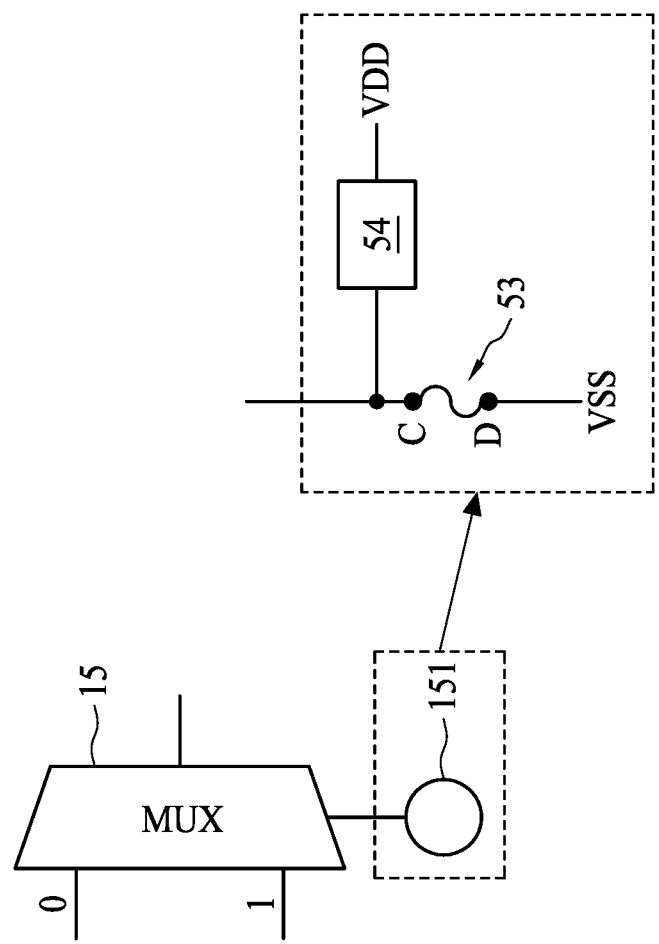

FIGS. 4A and 4B are schematic diagrams of the fuse devices 141 and 151, respectively. Referring to FIG. 4A, as shown in an amplified view, the fuse device 141 includes a fuse 51 and an anti-fuse 52. The fuse 51 includes one end coupled at a node A to a supply power VDD, and the other end coupled at a node B to the counter 14. As such, the fuse 51 initially is electrically connected between the power supply VDD and the counter 14. The anti-fuse 52 includes one end coupled at the node B to the counter 14 and the other end coupled to a reference voltage VSS. The anti-fuse 52 initially is electrically isolated from the counter 14. In the synchronization process, initially the fuse 51 is electrically connected between the nodes A and B, while the anti-fuse 52 is electrically disconnected. As a result, the counter 14 is powered by VDD and starts to count until the data pattern of the memory block 11 is read. Given a 4K memory block 11, the counter 14 is configured to count to 4,096.

When the data pattern of the memory block 11 is read, the fuse 51 is blown and becomes electrically disconnected. Meanwhile, the anti-fuse 52 turns from an electrically disconnected state to an electrically connected state. As a result, the counter 14 is disabled.

Referring to FIG. 4B, the multiplexer 15, which is a 2 to 1 multiplexer, includes one input (labeled "0") to receive an output from the counter 14, and the other input (labeled '1") to receive an output from the PRNG 12. Accordingly, if a select port (not numbered) coupled to the fuse device 151 receives a signal of logic 0, an output from the counter 14 is selected as the output of the multiplexer 15. In contrast, if the select port receives a signal of logic 1, an output from the PRNG 12 is selected as the output of the multiplexer 15.

Moreover, as shown in an amplified view, the fuse device 151 includes a fuse 53 and an anti-fuse 54. The fuse 53 includes one end coupled at a node C to the select port of the multiplexer 15, and the other end coupled at a node D to a reference voltage VSS. As such, the fuse 53 initially is electrically connected between the reference voltage VSS and the select port of the multiplexer 15. The anti-fuse 54 includes one end coupled at the node C to the select port of the multiplexer 15, and the other end coupled to a power supply VDD. The anti-fuse 54 initially is electrically isolated from the multiplexer 15. In the synchronization process, initially the fuse 53 is electrically connected between the nodes C and D, while the anti-fuse 54 is electrically disconnected. Consequently, the select port of the multiplexer 15 is connected to VSS, or logic 0, which selects an output from the counter 14 as an output of the multiplexer 15, while an output from the PRNG 12 is not selected. As a result, when the counter 14 starts to count, the multiplexer 15 selects an output from the counter 14 and sends the same to the row decoder 16 in order to read the memory block 11.

Subsequently, when the data pattern of the memory block 11 is read, the fuse 53 is blown and becomes electrically disconnected. Meanwhile, the anti-fuse 54 turns from an electrically disconnected state to an electrically connected state. Consequently, the select port of the multiplexer 15 is connected to VDD, or logic 1, which selects an output from the PRNG 12 as an output of the multiplexer 15, while an output from the counter 14 is not selected. As a result, when the counter 14 stops counting, the multiplexer 15 selects an output from the PRNG 12 and sends the same to the row decoder 16 in order to challenge the memory block 11 in the normal PUF operation.

The fuse device 171 is similar to or same as the fuse device 151 as described and illustrated with reference to FIG. 4B, and therefore is not discussed in detail. In the synchronization process, when the counter 14 starts to count, the multiplexer 17 including a select port connected to the fuse device 171 selects an output from the counter 14 and sends the same to the row decoder 16 in order to read the memory block 11. Subsequently, when the counter 14 stops counting, the multiplexer 17 selects an output from the PRNG 12 and sends the same to the bit multiplexer 18 in order to read output bits from the memory block 11 in the normal PUF operation.

The first path will be sealed off after the synchronization process and thus no path is available to read the data pattern of the memory block 11 directly any more. Moreover, from that point on a user can only access the PUF device 10 with a C/R pair port at an input of the PRNG 12 in the normal PUF operation.

Figure 5:
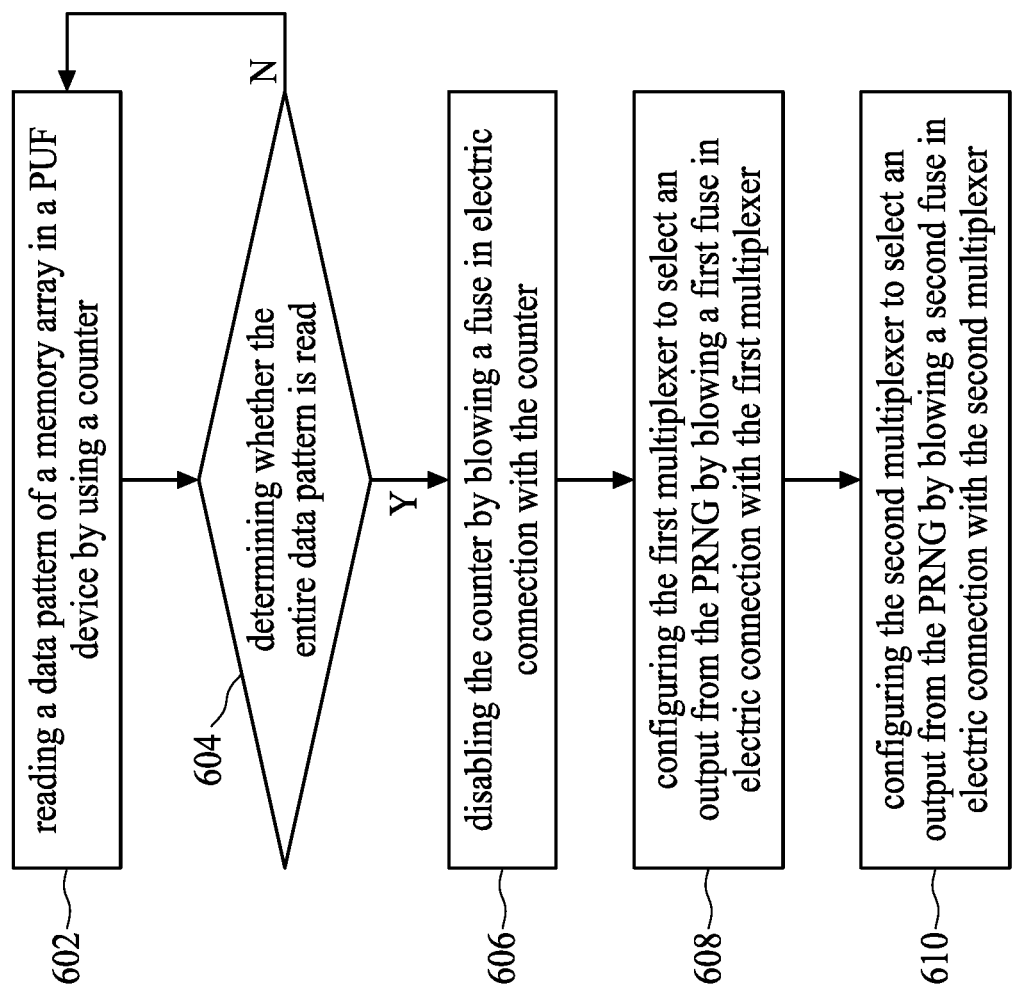
FIG. 5 is a flow diagram illustrating a method of operating a PUF device in accordance with some embodiments.

FIG. 5 is a flow diagram illustrating a method of operating a PUF device in accordance with some embodiments. The PUF device, similar to the PUF device 10 described and illustrated with reference to FIG. 1, includes a counter 14, a PRNG 12, a first multiplexer 15, a second multiplexer 17 and fuse devices 141, 151 and 171 associated with the counter 14, the first multiplexer 15 and the second multiplexer 17, respectively.

Referring to FIG. 5, in operation 602, a data pattern of a memory array in the PUF device is read by using the counter. The memory array is accessible by way of a first path in a synchronization process. The first path is established by not blowing the fuses in the fuse devices 141, 151 and 171.

In operation 604, it is determined whether the entire data pattern is read. If not, the counter continues counting in the synchronization process. If affirmative, in operation 606, the counter is disabled by blowing a fuse in electric connection with the counter. Also, in operation 608, the first multiplexer is configured to select an output from the PRNG by blowing a first fuse in electric connection with the first multiplexer. Moreover, in operation 610, the second multiplexer is configured to select an output from the PRNG by blowing a second fuse in electric connection with the second multiplexer. The operations 606, 608 and 610 are exchangeable in sequence. Subsequently, the memory array is accessible by way of a second path in a normal PUF operation process. The second path is established by blowing the fuses in the fuse devices 141, 151 and 171.

In some embodiments, the present disclosure provides a physically unclonable function (PUF) device. The PUF device includes a memory block such as a static random access memory (SRAM) block including an array of cells, and a pseudo random number generator (PRNG). The PRNG is configured to generate a number of addresses to challenge the memory block in response to an element selected out of a combination.

In some embodiments, the present disclosure also provides a method of extending challenge/response pairs in a physically unclonable function (PUF) device. The method comprises determining an address size "n" to challenge a memory array of $2^n$ cells in the PUF device, n being a natural number, determining a size of "m" bits of a response, m being a natural number, generating p n-bit addresses at p clock cycles to challenge the memory array in response to an element selected from a combination, p being a natural number, and repeating generation of p n-bit addresses for q times each running p clock cycles in response to different elements selected from the combination, where p multiplied by q equals m, and q being a natural number.

In some embodiments, the present disclosure provides a method of operating a physically unclonable function (PUF) device that includes a memory array, a counter, a pseudo random number generator (PRNG), a first multiplexer and a second multiplexer. The method comprises reading a data pattern of the memory array by the counter in a synchronization process, determining that the data pattern of the memory array is completely read, disabling the counter by blowing a fuse in electric connection with the counter, configuring the first multiplexer to select an output from the PRNG by blowing a first fuse in electric connection with the first multiplexer, and configuring the second multiplexer to select an output from the PRNG by blowing a second fuse in electric connection with the second multiplexer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A physically unclonable function (PUF) device, comprising:
   a memory block including an array of cells;
   a pseudo random number generator (PRNG) configured to generate a number of first addresses to challenge the memory block in response to an element selected out of a combination; and
   a counter configured to perform count operations to generate a number of second addresses to read a data pattern of the memory block, wherein when the counter is configured to perform the count operations, each of the second addresses generated from the counter serves as an address to address a memory bank; when the PRNG is configured to challenge the memory block, each of the first addresses generated from the PRNG serves as an address to address the memory hank;
   wherein the array of cells has $2^n$ cells, n being a natural number, and the PRNG comprises a linear function shift register (LFSR) configured to generate an n-bit address at each clock cycle, the n-bit address serving as one of the first addresses.

2. The PUF device according to claim 1, further comprising:
   a multiplexer, having a first input, a second input and an output node, the first input being coupled to the PRNG, the second input being coupled to the counter, an address outputted from the output node serving as an address to address the memory bank, wherein the multiplexer is configured to selectively couple one of the first input and the second input to the output node to select one of an output of the PRNG and an output of the counter as the address to address the memory bank.

3. The PUF device according to claim 1, wherein the memory block includes a static random access memory (SRAM) block.

4. The PUF device according to claim 1, wherein the LFSR is configured to run p clock cycles to generate p n-bit addresses in response to an element selected from the combination, and repeat q times each running p cycles in response to different elements, where, given a response of m bits, p multiplied by q equals m, p, q and m being natural numbers.

5. The PUF device according to claim 1, wherein the counter is configured to count to $2^n$ to generate the second addresses.

6. The PUF device according to claim 5 further comprising:
   a fuse device including:
   a fuse, electrically connected between the counter and a power supply, configured to be blown when the counter counts to $2^n$; and
   an anti-fuse, electrically isolated from the counter, configured to electrically connect the counter to a reference voltage.

7. The PUF device according to claim 5 further comprising:
   a first multiplexer including an input to receive an output from the counter, and another input to receive an output from the LFSR.

8. The PUF device according to claim 7 further comprising:
   a first fuse device including:
   a fuse, electrically connected between a select port of the first multiplexer and a reference voltage, configured to be blown when the counter counts to $2^n$; and
   an anti-fuse, electrically isolated from the first multiplexer, configured to electrically connect the select port of the first multiplexer to a power supply.

9. The PUF device according to claim 5 further comprising:
   a second multiplexer including an input to receive an output from the counter, and another input to receive an output from the LFSR.

10. The PUF device according to claim 9 further comprising:
    a second fuse device including:
    a fuse, electrically connected between a select port of the second multiplexer and a reference voltage, configured to be blown when the counter counts to $2^n$; and
    an anti-fuse, electrically isolated from the second multiplexer, configured to electrically connect the select port of the second multiplexer to a power supply.

11. A method of operating a physically unclonable function (PUF) device that includes a memory array, a counter, a pseudo random number generator (PRNG), a first multiplexer and a second multiplexer, the method comprising:

reading a data pattern of the memory array by the counter in a synchronization process, wherein a plurality of outputs from the counter serve as a plurality of first addresses to address the memory array;

determining that the data pattern of the memory array is completely read;

disabling the counter by blowing a fuse in electric connection with the counter;

configuring the first multiplexer to select an output from the PRNG by blowing a first fuse in electric connection with the first multiplexer;

configuring the second multiplexer to select an output from the PRNG by blowing a second fuse in electric connection with the second multiplexer; and challenging the memory array according to the outputs from the PRNG through the first multiplexer and the second multiplexer respectively, wherein the outputs from the PRNG serve as a plurality of second addresses to address the memory array;

wherein in the synchronization process, the method further comprises:

configuring the first multiplexer to select an output from the counter by maintaining the first fuse in electric connection with the first multiplexer; and configuring the second multiplexer to select an output from the counter by maintaining the second fuse in electric connection with the second multiplexer.

12. The method according to claim 11, wherein the data pattern includes start-up states of cells in the memory array.

13. The method according to claim 11, wherein the PRNG includes a linear function shift register (LFSR).

14. The method according to claim 13, further comprising:

utilizing the LFSR to generate an n-bit address at each clock cycle, the n-bit address serving as one of the second addresses.

15. The method according to claim 11, wherein the PUF device includes a fuse device that includes the fuse in electric connection with the counter, further comprising:

electrically isolating an anti-fuse in the fuse device from the counter in the synchronization process; and electrically connecting the anti-fuse to the counter to disable the counter after the synchronization process.

16. The method according to claim 11, wherein the PUF device includes a first fuse device that includes the first fuse in electric connection with the first multiplexer, further comprising:

electrically isolating an anti-fuse in the first fuse device from the first multiplexer in the synchronization process; and electrically connecting the anti-fuse to the first multiplexer after the synchronization process.

17. The method according to claim 11, wherein the PUF device includes a second fuse device that includes the second fuse in electric connection with the second multiplexer, further comprising:

electrically isolating an anti-fuse in the second fuse device from the second multiplexer in the synchronization process; and electrically connecting the anti-fuse to the second multiplexer after the synchronization process.

18. A physically unclonable function (PUF) device, comprising:

a memory block including an array of cells;

a multiplexer, having a first input, a second input and an output node, the first multiplexer being configured to selectively couple one of the first input and the second input to the output node, an address outputted from the output node serving as an address to address the array of cells of the memory block;

a counter coupled to the first input of the multiplexer, the counter configured to, when the multiplexer is configured to couple the first input to the output node in a synchronization process such that the counter is coupled to the memory block, perform count operations to generate a number of first addresses, wherein each of the first addresses generated from the counter is sent to the output node to serve as the address to address the array of cells to read a data pattern of the memory block; and a pseudo random number generator (PRNG), coupled to the second input of the multiplexer, the PRNG configured to, when the multiplexer is configured to couple the second input to the output node such that the counter is uncoupled from a memory bank, generate a number of second addresses to challenge the memory block in response to an element selected out of a combination, wherein each of the second addresses generated from the PRNG is sent to the output node to serve as the serves as an address to address the memory block when the PRNG is configured to challenge the memory block.

19. The PUF device according to claim 18, wherein the array of cells has $2^n$ cells, n being a natural number, and the PRNG comprises a linear function shift register (LFSR) configured to generate an n-bit address at each clock cycle, the n-bit address serving as one of the second addresses.

20. The PUF device according to claim 19, wherein the counter is configured to count to $2^n$ to read the data pattern of the memory block.

* * * * *